April 17, 1962 J. P. BYRD 3,029,650
PUMPING DEVICE
Filed June 9, 1958 9 Sheets-Sheet 1

FIG. I.

INVENTOR.
JOSEPH P. BYRD
BY
ATTORNEY

April 17, 1962 J. P. BYRD 3,029,650
PUMPING DEVICE
Filed June 9, 1958 9 Sheets-Sheet 2

INVENTOR.
JOSEPH P. BYRD
BY
ATTORNEY

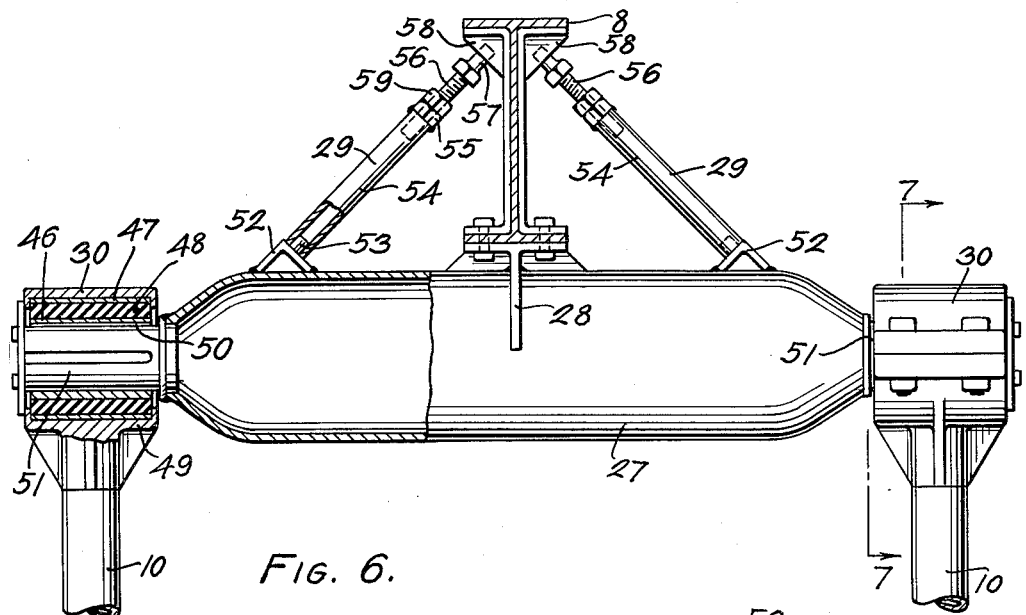
FIG. 6.
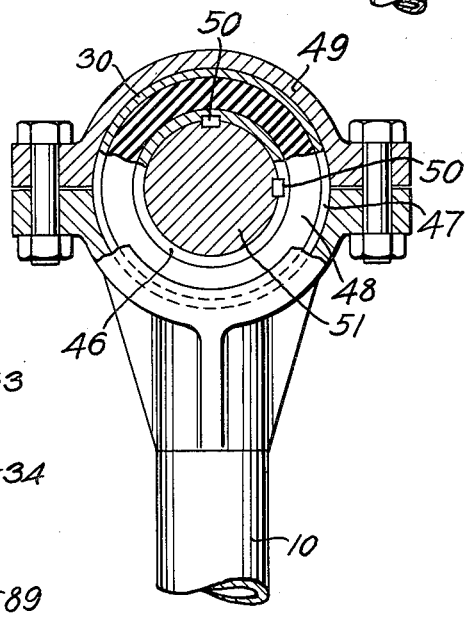
FIG. 7.
FIG. 8.
INVENTOR.
JOSEPH P. BYRD
BY
ATTORNEY

INVENTOR.
JOSEPH P. BYRD
ATTORNEY

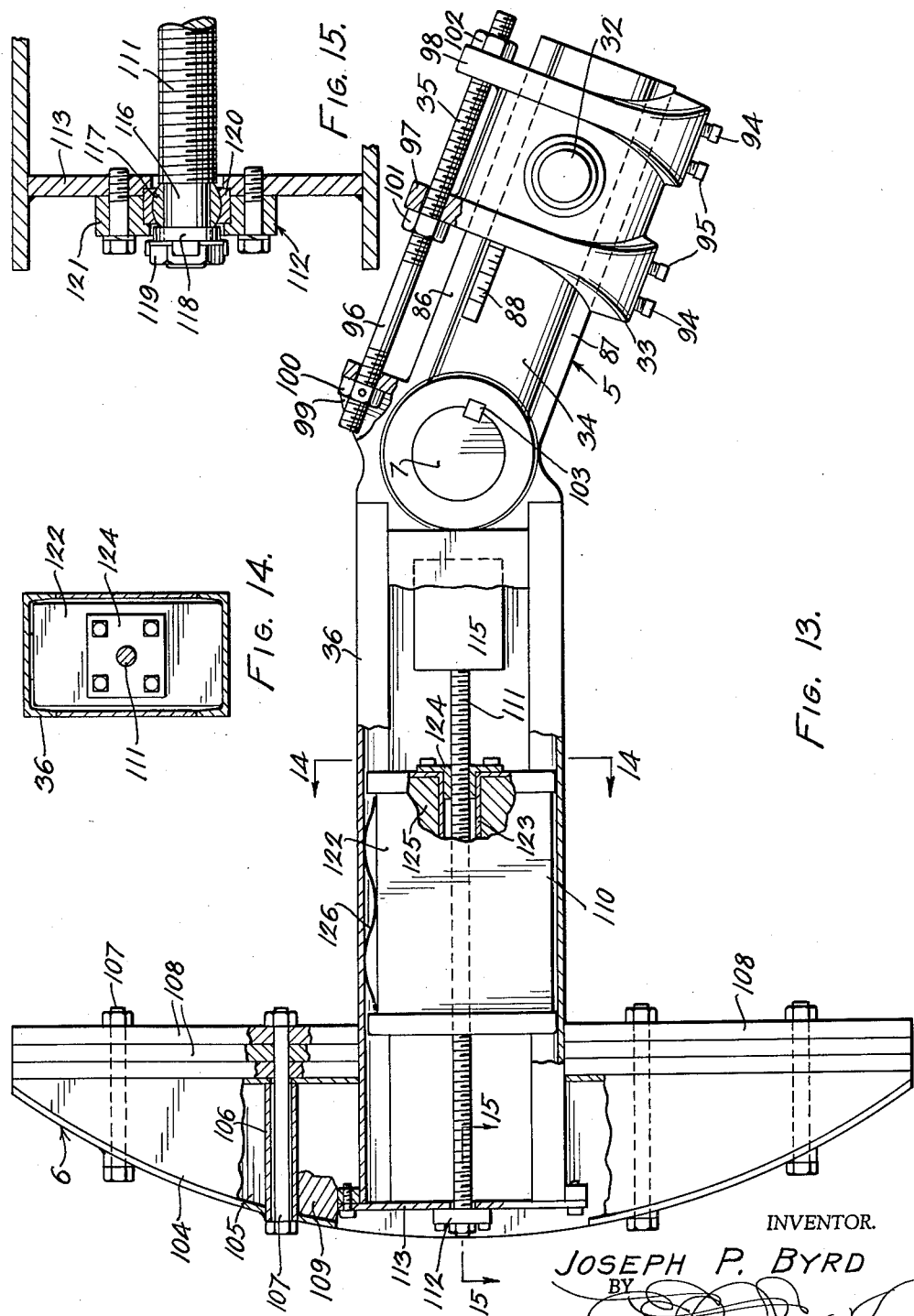

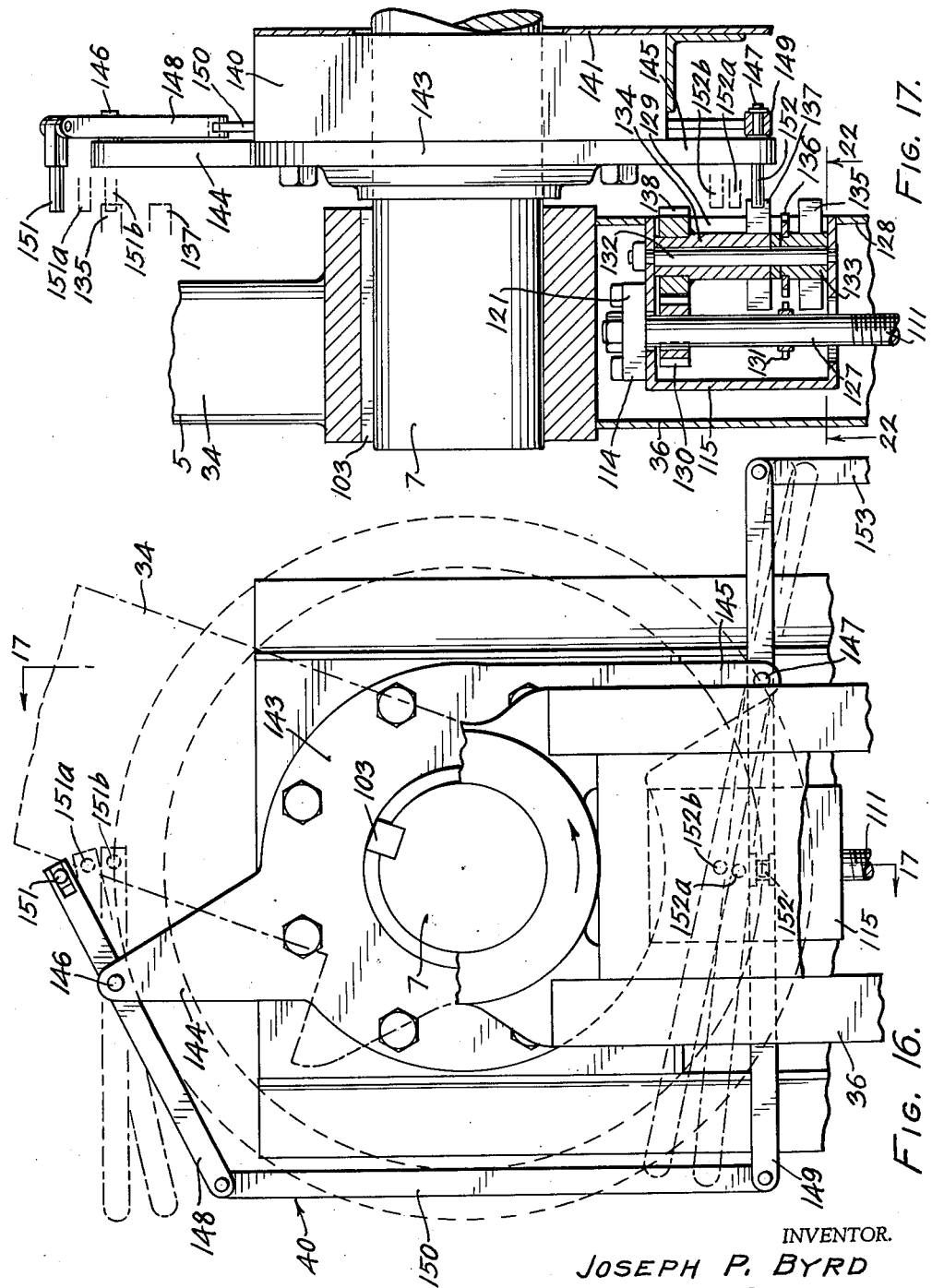

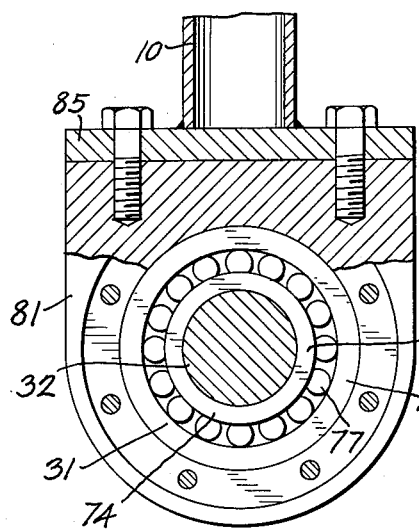
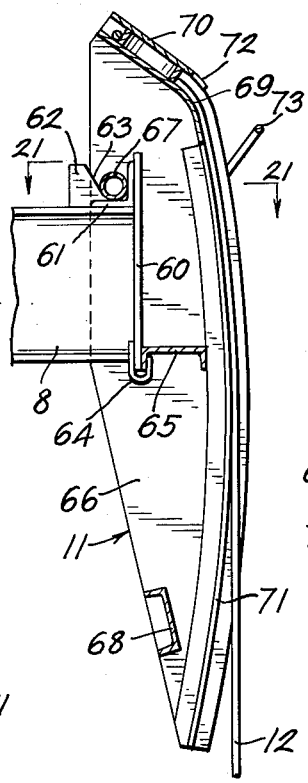
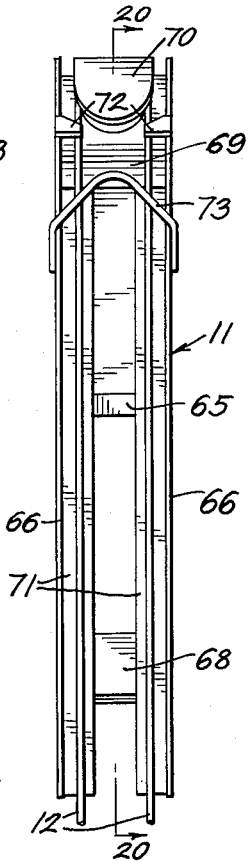
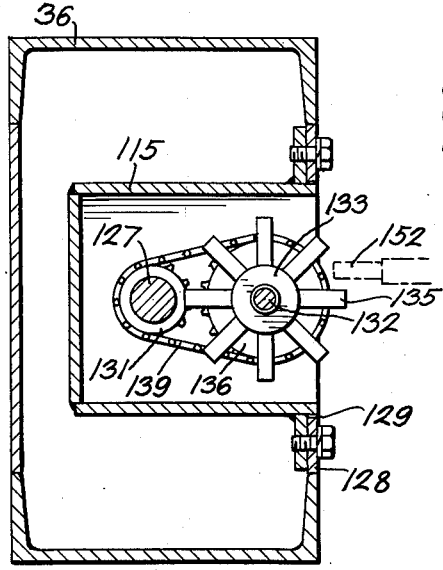
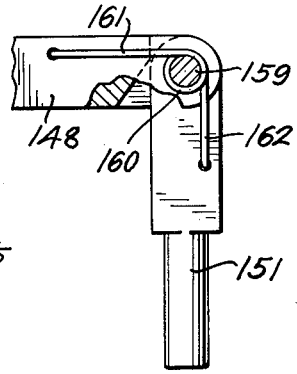

April 17, 1962  J. P. BYRD  3,029,650
PUMPING DEVICE

Filed June 9, 1958  9 Sheets-Sheet 9

INVENTOR.
JOSEPH P. BYRD
BY
ATTORNEY

United States Patent Office 3,029,650
Patented Apr. 17, 1962

3,029,650
PUMPING DEVICE
Joseph P. Byrd, Denver, Colo., assignor to Oilfield Equipment Corporation of Colorado, Denver, Colo.
Filed June 9, 1958, Ser. No. 740,822
10 Claims. (Cl. 74—41)

This invention relates generally to pumping units and, more specifically, to a mechanical pumping device of the type particularly well adapted for use in elevating oil or other liquids to the surface from within deep wells.

The pumping unit that forms the subject matter of the present invention, while incorporating most of the structural elements common to nearly all mechanical oil field pumpers such as, for example, a prime mover, a reducer, cranks, pitmans, crank counterweights and a walking beam, is unique among devices of this type in the improved design, and especially the novel arrangement, of these conventional components. By way of illustration, the placement of the chain or gear box on the well-side of the Samson post rather than at the rear of the unit, as is the case of the conventional beam-type mechanical pumper, results in a significant improvement in the reciprocatory motion induced in the rod string. The front-driven mechanical pumper of the present invention when designed to include the most disadvantageous pitman-crank ratio, namely ∞:1, will produce a motion at the polished rods that is equal to the best motion that it is possible to realize with a conventional rear-driven beam-type pumper operating with an ∞:1 pitman-crank ratio insofar as the static, inelastic load of the rod string is concerned; whereas, when these units are driven with any finite pitman-crank ratio, the front driven pumper produces a far superior motion.

The counterbalance system and means by which a trim-weight section thereof is semi-automatically adjusted to maintain the unit in a balanced condition, constitutes another significant improvement found in the pumping device of the present invention. In accordance with the teaching found herein, the counterbalance system carried by the cranks is divided into a coarse-weight section and a trim-weight section. The coarse-weight section constitutes the greater part of the total counterbalance and is located semi-permanently at a point on the crank farthest from the crank shaft in order that the maximum counterbalancing potential thereof may be realized. The trim-weight section of the counterbalance system, on the other hand, is mounted for radial movement on the crank between extreme positions relative to the crank shaft which encompass the normal operating limits through which it is advisable to adjust the counterweights in order to place the unit in balance under variable well loads. By separating the crank counterbalance into coarse and trim-weight sections; it becomes possible to make use of the ultimate counterbalancing effect of the coarse weights at all times while providing trim weights that are adapted to semi-automatic counterbalancing techniques. This semi-automatic counterbalancing system is unique in that the mechanical energy available from the rotating cranks is used to accomplish the radial movement of the trim-weights within the crank quill. Furthermore, the mechanical means by which the trim-weights are semi-automatically adjusted is designed to always "fail safe" so that these weights cannot shift but will stop immediately in the event of a breakdown.

Still another worthwhile advantage over the prior art mechanical pumpers is the improved chain reducer incorporated in the pumping unit of the instant invention. Among its novel features are a self-lubricating system for the bearings, chain and sprockets, and means for adjusting the tension in either one of two sprocket chains attached between different sprockets without affecting the other.

Perhaps the most important single feature of the mechanical pumper described herein is, however, the design and arrangement of the components in a manner to greatly improve upon the heretofore fluctuating torque requirements of the prime mover. By subjecting the prime mover to much more uniform torque loads and substantially eliminating the undesirable "back-drive" found in nearly every other oil field pumping unit, the overall efficiency of the unit is increased to a marked degree which, of course, is accompanied by a resultant reduction in operating costs, initial expense of the prime mover, repair costs and power requirements. Briefly, this is accomplished by selective placement of the reducer between the well-head and the Samson post, a unique offset crank design, and careful selection of a beneficial pitman-crank ratio. It has now been found in accordance with the teachings of the instant invention that an ideal torque relationship can be approached much more closely than was heretofore considered possible by proper arrangement and design of the aforementioned unit components in a manner to effect a change in the phase and amplitude relationships that exist between the curves which represent the torque demands of the well-load and counterweight force system acting on the prime mover.

Finally, the instant mechanical pumper incorporates a number of incidental improvements such as the improved means for aligning the horsehead and walking beams, and the simplified connection between the cranks and pitmans that facilitates adjustment of the stroke length. Certainly not the least important advantage of the pumper shown and described herein is the fact that it retains all of the well-known desirable features of the conventional mechanical unit including ruggedness, dependability, simplicity, low maintenance costs, and the ability to operate under extreme temperature and weather conditions, while improving on a number of its undesirable characteristics.

It is, therefore, the principal object of the present invention to provide an improved mechanical oil field pumper.

A second object is the provision of a mechanical pumping unit which produces a more beneficial type of reciprocatory motion in the polished rods.

A third object is to provide an improved crank counterbalance system wherein the counterweights are divided into a fixed coarse-weight section and a movable trim-weight section.

A fourth objective is the provision of means for accomplishing semi-automatic adjustment of the trim-weights in order to maintain the pumper in a balanced condition under varying well-loads.

A fifth object is to provide a semi-automatic crank counterbalance adjustment system which will always "fail safe."

A sixth objective is the provision of an improved chain reducer for pumping units and the like that incorporates a novel chain adjustment feature and self-lubrication system.

A seventh object is to provide means for effecting alignment of the horsehead and walking beam relative to the well-head.

An eighth objective is to provide a mechanical oil field pumper in which various components common to nearly all pumping units are rearranged and redesigned to place a smaller and considerably more uniform torque load on the prime mover.

The ninth object of the present invention is to provide a pumping unit in which the reducer is located between the Samson post and well-head in position to produce a beneficial polished rod motion and, at the same time, equalizing the half-cycle torque amplitudes induced by the well-load thereby continuously varying the effective lifting moment of the unit.

Another object is to provide a pumping unit incorporating a unique offset crank arrangement which functions to accomplish a beneficial phase shift between the substantially sinusoidal torque loads generated in the prime mover by the rotating crank counterweights and the reciprocating well-load.

Still another object of the invention is the provision of a novel mechanical oil well pumping unit which utilizes an improved pitman-crank ratio that creates a beneficial motion at the polished rod while modifying the half-cycle torque loads on the prime mover induced from the well-load in a manner to produce a reasonably constant non-reversible torque demand.

Additional objects of the invention are to provide a mechanical oil field pumper which is simple, rugged, relatively inexpensive, easy to operate and service, dependable, considerably more efficient, cheaper to operate, and adaptable for use under varying well-load conditions.

Further objects are the provision of an oil well pumping unit which is purely mechanical and retains the many advantages of the conventional mechanical pumper such as, for example, low maintenance costs and serviceability under widely variant temperature and weather conditions, while affording substantial improvements over several of the undesirable features of the conventional unit.

Other objects will be in part apparent and in part pointed out specifically hereinafter in connection with the description of the drawing that follows, in which:

FIGURE 6 is an enlarged fragmentary section taken along line 6—6 of FIGURE 1 showing the upper pitman bearings, cross yoke and walking beam;

FIGURE 7 is a further enlarged fragmentary section of the upper pitman bearing taken along line 7—7 of FIGURE 6;

FIGURE 8 is an enlarged fragmentary section taken along line 8—8 of FIGURE 1 showing the lower pitman bearing and the adjustable connection between the pitman and crank;

FIGURE 13 is an enlarged side elevation of the crank, portions of which have been broken away and shown in section to illustrate the location and operation of the semi-automatic crank counterbalance system carried thereby;

FIGURE 14 is a section taken along line 14—14 of FIGURE 13 showing the location of the adjustable trim-weight section of the counterbalance system within the hollow crank quill;

FIGURE 15 is an enlarged fragmentary section taken along line 15—15 of FIGURE 13 showing the self-aligning bearing within which the trim-weight screw is journalled for rotation at the outboard end of the hollow crank quill;

FIGURE 16 is an enlarged fragmentary side elevation, portions of which have been broken away, showing the linkage used to effect semi-automatic adjustment of the trim-weight in the hollow crank quill;

FIGURE 17 is a fragmentary section taken along line 17—17 of FIGURE 16 showing the gear train and chain drive carried by the crank which, when actuated through the link assembly, will function to run the trim-weight in and out on the screw journalled within the quill;

FIGURE 18 is a fragmentary section taken along line 18—18 of FIGURE 8 showing the lower pitman bearing;

FIGURE 19 is a front elevation of the horsehead to an enlarged scale;

FIGURE 20 is a fragmentary section taken along line 20—20 of FIGURE 19 showing the horsehead;

FIGURE 21 is a fragmentary section taken along line 21—21 of FIGURE 20 showing the detachable connection between the walking beam and horsehead;

FIGURE 22 is a further enlarged fragmentary section taken along line 22—22 of FIGURE 17, showing the chain drive for rotating the screw journalled within the hollow crank quill;

FIGURE 23 is an enlarged fragmentary detail of the kicker used to strike and rotate the paddle wheels which, in turn, effect rotation of the screw by means of the gear train and chain drive operatively connected thereto;

Figure 1:
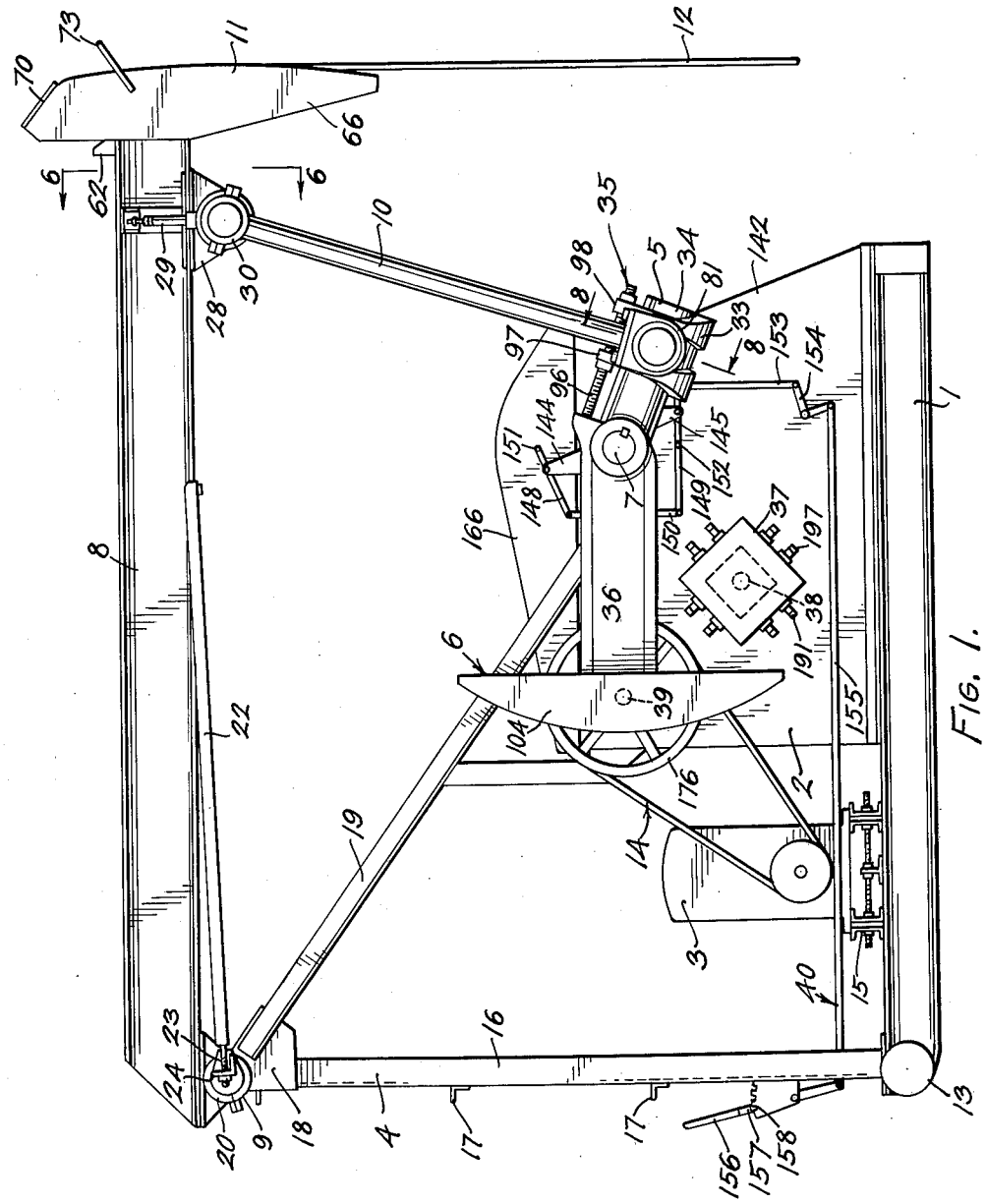
FIGURE 1 is a side elevation of the improved mechanical pumping unit of the present invention.
Figure 2:
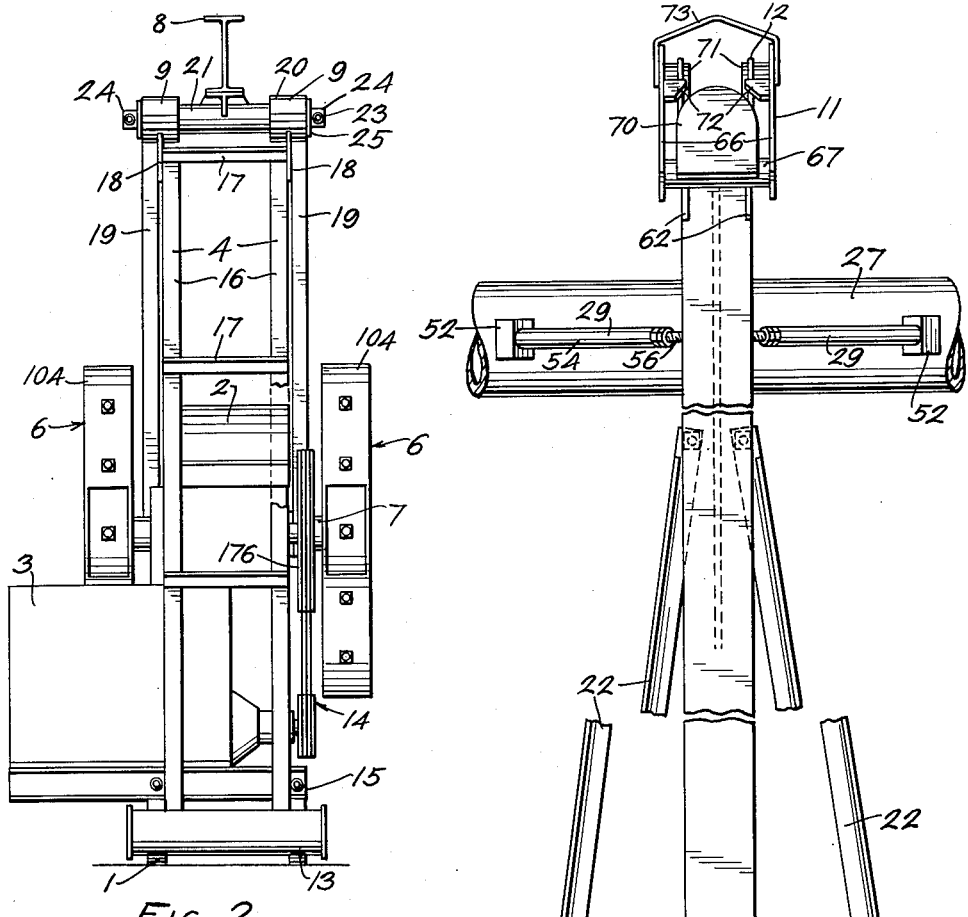
FIGURE 2 is a rear elevation thereof, portions having been broken away to better show the construction.
Figures 3, 4, 5:
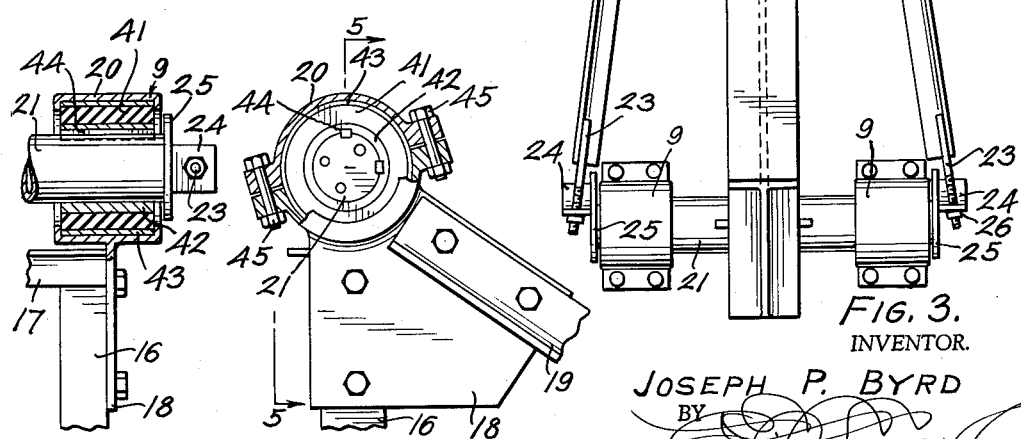
FIGURE 3 is a top plan view, portions of which have been broken away to conserve space.
FIGURE 4 is a fragmentary elevation to an enlarged scale and partly in section showing the saddle bearing on which the walking beam is mounted.
FIGURE 5 is a section taken along line 5—5 of FIGURE 4.

Referring now to the drawings, and in particular to FIGURES 1 through 3 thereof, it will be seen that the improved mechanical pumping unit of the present invention includes several basic elements common to nearly all beam-type mechanical pumpers, namely: a base 1 upon which is supported a reducer 2, a prime mover 3 and a Samson post 4; cranks 5, including a crank counterbalance system indicated in a general way by numeral 6, mounted on the crank shaft 7 of the reducer; a walking beam 8 journalled for rockable movement within saddle bearings 9 carried on the upper end of the Samson post 4; pitmans 10 operatively interconnecting the cranks 5 with the walking beam 8 to effect reciprocating movement thereof; and a horsehead 11 attached to the front or well-end of the walking beam 8 from which is suspended a rod string (not shown) by means of a wire line 12. The base 1 is formed from heavy structural steel elements which will not be described in detail and, in the form shown, one end 13 of the base is upturned slightly to form a skid. When the unit is located on a well-site, the base is usually bolted or otherwise semi-permanently attached to a poured concrete slab in accordance with conventional practice.

Certainly one of the most important and unique features of the pumping unit of the present invention is the placement of the reducer 2 on the well-side of the Samson post 4 where it is bolted or otherwise permanently attached to the base 1; however, a detailed discussion and explanation of the advantages achieved by the proper location of the reducer in relation to the post, walking beam, crank and pitman connections will be reserved for a later section wherein the theory and improved operating characteristics achieved through a novel unit geometry will be set forth with particularity. The prime mover 3 is preferably located on the base 1 between the reducer 2 and Samson post 4 so that it can be serviced while the unit is operating without the danger of the operator being struck by the cranks. Prime mover 3 is conventional and may either be of the electric or internal combustion types well known to the oil field pumper art. It is operatively connected to the reducer through a conventional multiple belt and pulley drive indicated generally by numeral 14. Also, prime mover 3 may be attached as shown to a motor mount 15 which is carried by the base 1 for longitudinal slidable movement relative to the reducer 2 so that the tension in the belt drive 14 may be adjusted. The particular movable motor mount 15 shown herein will not be described in detail and is intended as being merely illustrative of one type that could be used.

The Samson post 4 is attached to the rear end of the base 1 and includes spaced upright tension members 16 interconnected by cross-ties 17, anchor plates 18 attached to the upper extremities of the tension members, and spaced compression members 19 connect between the anchor plates and opposite sides of the reducer 2. The housings 20 of the saddle bearings 9 are carried by the anchor plates 18 and have been shown formed integrally therewith. The tubular saddle 21 is mounted within the saddle bearings 9 for limited rotational movement about a horizontal and transverse axis. The walking beam 8 has the rear end thereof welded or otherwise rigidly attached to the saddle 21 in a position substantially normal thereto and at a point midway between its ends.

On occasion, after the unit has been anchored in place on its concrete slab, it becomes desirable to make minor adjustments in the location of the horsehead 11 in relation to the well-bore to insure proper alignment therebetween. Such adjustments are most easily accomplished through a small lateral shift in the walking beam. In accordance with the teaching found herein, the walking beam is provided with two struts 22 extending from opposite sides thereof at a point toward the front end, rearwardly in divergent relation to a point of attachment on the outboard ends of the saddle 21. The rear end of each strut 22 terminates in a bolt 23 which passes through an aperture in a bracket 24 attached to a face plate 25 on the ends of the saddle. A nut 26 on the end of bolt 23 bears against the bracket 24 and tensions one of the struts in a manner to swing the front end of the walking beam laterally into the desired position for proper alignment of the horsehead over the well-bore.

On the underside of the walking beam 8 adjacent the free end thereof which carries the horsehead 11, is rigidly attached a cross yoke 27 which is welded in transverse relation to a yoke mounting bracket 28 bolted to the beam. A pair of head-alignment jacks 29, which will be described in detail in connection with FIGURES 1, 3 and 6 are also connected between the cross yoke 27 and beam 8 for accomplishing torsional deflection of the beam should it be twisted enough to misalign the horsehead from a true vertical position. The outboard ends of the cross yoke 27 are attached within upper pitman bearings 30 carried on the upper ends of pitman 10.

The lower pitman bearings 31 carried on the lower ends of pitmans 10 are journalled for rotation on wrist pins 32, FIGURE 8, depending from adjustable crank couplings 33 mounted on the offset portions 34 of cranks 5 for longitudinal slidable movement. Screw means 35 for adjusting the stroke length and pitman-crank ratio is connected between the crank 5 and the crank couplings 33 for sliding the same along off-set portions 34 as will be described presently in connection with FIGURES 1, 8 and 13. At this point it would be well to point out that the novel unit geometry of the present pumping unit is such that the pitmans 10 are connected to the cranks 5 on the opposite side of the crank shaft 7 from the crank counterbalance assembly 6. Also, note the obtuse angular relation between the hollow crank quill 36 of crank 5 which carries the crank counterbalance 6, and offset portion 34 to which the pitmans 10 are connected.

Two additional elements should be referred to broadly in connection with FIGURE 1 before proceeding with a detailed description of the various components and assemblies. First of all, reference numeral 37 designates the novel means whereby the intermediate shaft 38 of the chain reducer 2 can be moved relative to either high speed shaft 39 or low speed crank shaft 7 to adjust the tension in one sprocket chain without affecting the tension in the other. In addition, FIGURE 1 shows the hand-operated linkage, indicated in a general way by numeral 40, which is used to shift the trim-weight section of the counterbalance system toward and away from the crank shaft 7 within the hollow quill 36 of crank 5.

Referring now to FIGURES 4 and 5 of the drawings, it will be seen that the saddle bearings 9 are of the torsion type having a tubular rubber elastic element 41 bonded to, and positioned in between, inner and outer metal sleeves 42 and 43, respectively. The inner sleeve 42 is keyed to the end of the saddle 21 as indicated at 44; whereas, the outer sleeve 43 is non-rotatably clamped within bearing housing 20 by bolts 45. Thus, when saddle 21 rotates due to the reciprocating movement of the walking beam to which it is attached, inner sleeve 42 will rotate also and flex elastic member 41 torsionally within the outer sleeve 43 which is fixedly clamped to the bearing housing 20.

In connection with FIGURES 6 and 7, it will be noted that upper pitman bearings 30 are also of the torsion type having inner and outer metal sleeves 46 and 47, respectively, bonded to tubular elastic element 48 mounted therebetween. In much the same manner as has already been described with respect to the saddle bearings, the upper pitman bearing housing 49, which is welded or otherwise permanently attached to the upper end of each pitman, is clamped non-rotatably to the outer sleeve 47; whereas, the inner sleeve 46 thereof is non-rotatably attached by keys 50 to the cylindrical end section 51 of the cross yoke 27.

FIGURES 1, 3 and 6 show the head-alignment jacks 29 which act in compression to effect torsional deflection of the beam 8 and remove any twist therein required to straighten the horsehead over the well-bore. Angle brackets 52 are welded to the cross yoke 27 on opposite sides of the beam. Each bracket includes a pin 53 pointing inwardly and upwardly toward the top flange of the beam 8, as shown most clearly in FIGURE 6. These pins fit inside the lower ends of pipes 54 which form a part of the jacks. A nut 55 is welded onto the upper end of each pipe 54 and a bolt 56 is threaded therein having a projection 57 on the head thereof which fits into a bracket 58 located on the beam between the web and upper flange. A lock nut 59 is also provided on the bolt. By merely loosening the lock nuts 59 and threading one bolt 56 out of nut 55 while the other bolt is turned in a similar amount, the beam can be twisted relative to the cross yoke 27.

The horsehead 11 will be described in detail with reference to FIGURES 8, 19, 20 and 21. The free end of the walking beam 8 is provided with an end plate 60 behind which is attached a short section of angle iron 61 and a plate 62 having an upwardly opening notch 63. Attached to the bottom edge of end plate 60 is a U-shaped member 64 which receives the downturned inner flange of spacer 65 connected between the sideplates 66 of the horsehead; while, at the same time, a pipe section 67 extending between the sideplates above and to the rear of spacer 65 is positioned to fit into the notch 63 on top of the beam. Another spacer 68 is preferably connected between the sideplates 66 adjacent the lower end of the horsehead. The top of the horsehead is closed by a plate 69 recessed behind the leading edges of the sideplates upon which is mounted a flanged loop-retaining cap 70. Line-tracks 71 extend downwardly from plate 69 recessed along the leading edges of the sideplates 66. Each sideplate also includes a line-retaining projection 72 extending inwardly over the tracks 71 adjacent the cap 70, and a hanger bar 73 is provided on the front of the horsehead for use in lifting it free of the walking beam.

The lower pitman bearing 31 is seen in FIGURES 1, 8 and 18. It is of the self-aligning type having an inner race 74 non-rotatably mounted on wrist pin 32 between an annular section 75 of increased diameter and an end plate 76. Two rows of short barrel rollers 77 are mounted for rolling movement on adjacent spherically-shaped surfaces 78 of the inner race. Outer race 79 includes a spherically-shaped surface 80 in rolling engagement with both rows of barrel rollers. The outer race 79 is retained non-rotatably within a housing 81 by outer and inner face plates 82 and 83, respectively, which engage said race and prevent axial movement thereof. Inner face plate 83 is provided with a flexible grease seal 84 which forms an annular seal with section 75 of the wrist pin. The housing 81 is bolted or otherwise attached to plate 85 welded to the lower extremity of the pitman 10.

FIGURES 1, 8 and 13 will be referred to in describing the crank coupling 33 and its adjustable connection with offset portion 34 of the cranks 5. First of all, offset portion 34 of the cranks will be seen to be generally tubular while including tapered ribs 86 and 87 formed on opposite outside surfaces thereof to extend in the direction of the length of the crank. The suitable scale 88 may also be attached to the offset portion of the crank as shown, to indicate the exact location of the crank coupling 33 relative thereto so that the pitman-crank ratios on both sides of the unit can be set the same.

Crank coupling 33 is provided with an opening 89 therethrough containing longitudinally extending aligning grooves 90 and 91 located to receive ribs 86 and 87, respectively, on the offset portion 34 of the crank. Groove 90 is flared to receive rib 86 with a wedging action when a force is applied to the offset portion of the crank in a direction to seat the rib within said groove; whereas, free-sliding movement therebetween is possible in the absence of such a force. Groove 91, which is located opposite groove 90, has spaced substantially parallel sides 92 that are inclined such that one side lies flat against the outside inclined face of tapered rib 87; whereas, the other side engages the outside inclined face of tapered wedge 93, the inside face of which lies against the inside face of rib 87. Two set screws 94 and 95 are threaded through opposite ends of the crank coupling into engagement with rib 87 and wedge 93, respectively. Thus, upon release of these set screws, the crank coupling 33 is free to slide longitudinally along offset portion 34 of each crank 5 to vary the pitman-crank ratio by means of the screw assembly which will now be described.

Actual longitudinal adjustment of the crank coupling relative to the offset portion of the crank is accomplished by means of screw 96 which extends longitudinally through openings in integral ears 97 and 98 formed on the coupling 33 and a socket 99 formed in the crank. A nut 100 is non-rotatably mounted on screw 96 and, in turn, non-rotatably retained within socket 99 in the crank. Nuts 101 and 102 are threaded onto screw 96 in position to lap ears 97 and 98, respectively.

Therefore, when it becomes necessary to vary the pitman-crank ratio of the unit, set screws 94 and 95 are loosened to free rib 86 from within groove 90 and rib 87 from wedge 93 and groove 91; whereupon, one of the nuts 101 or 102 is backed off from the adjacent ear 97 or 98 of the coupling in the direction of desired movement thereof and the other nut is turned in a direction to close the gap formed therebetween. Once the desired position of the coupling on the offset portion of the crank has been achieved, set screws 94 are tightened which forces rib 86 to wedge into groove 90 and set screws 95 are tightened to force wedge 93 in between the side of groove 91 and rib 87. Wedge 93, of course, also acts against rib 87 in a manner to wedge rib 86 into groove 90.

The crank counterbalance system and actuating means therefor which have been indicated generally by numerals 6 and 40, respectively, can best be seen in FIGURES 1, 13–17, 22 and 23. The cranks 5 are attached to low speed crank shaft 7 for conjoint rotation therewith by means of key 103. Offset portion 34 of each crank extends normal to the shaft in one direction; whereas, the follow crank quill 36 extends in the other as best shown in FIGURES 1 and 13. The outer or free end of quill 36 carries the coarse-weight section 104 of the counterbalance system 6 which includes a compartment 105 having a cross section shaped to generally conform with a minor sector of the crank circle as generated by a point on the end of the quill. Passing through compartment 105 are a plurality of stud housings 106 which receive studs 107 that are used to hold lead slugs 108 onto the outside of said housing as shown. In addition, compartment 105 is preferably filled with molten lead as indicated at 109 to complete the coarse-weight section 104 of the counterbalance assembly. The coarse weights are semi-permanent and usually comprise about 80% of the total crank counterbalance, the remaining 20% or so being the trim-weight section 110 which will now be described.

The quill 36 of each crank 5 is hollow and includes a screw journalled for rotation within bearing 112 carried by end plate 113 on the outer end of said quill and bearing 114 attached to gear box 115 on the inner end thereof. Bearings 112 and 114 are of the self-aligning type shown in detail in FIGURE 15. The screw 111 includes a cylindrical section 116 of reduced diameter upon which is mounted a truncated spherical bearing 117 retained in place by collar 118 and nut 119. A two-part race 120 includes a spherical surface to receive bearing element 117 and is held in place against end plate 113 by a housing 121.

The trim-weight 110 of FIGURES 13 and 14 comprises a box 122 having a hollow core 123 therethrough into the ends of which are fastened internally threaded sleeves 124 which receive the screw 111. Self-aligning bearings may be substituted for the sleeves 124 illustrated herein. Box 122 is filled with lead as indicated at 125 and a leaf spring 126 is preferably positioned between the box and adjacent wall of the quill as shown to eliminate the possibility of the trim-weight 110 rocking within the crank. Thus, upon rotation of the screw 111 in one direction, the trim-weight 110 will move radially out or away from the crank shaft 7 within the hollow crank quill 36; whereas, rotation of the screw in the opposite direction will move the trim-weight radially in or toward the crank shaft.

The means by which the screw is rotated will now be described in connection with FIGURES 16, 17 and 22. Screw 111 includes an unthreaded section 127 lying within gear box 115 attached to the inside wall 128 of the crank quill adjacent opening 129 therein. Fixed to section 127 of the screw are a spur gear 130 and a sprocket gear 131. An axle 132 is also mounted within gear box 115 in spaced parallel relation to screw 111. Gear hubs 133 and 134 are mounted on axle 132 for independent relative rotation, hub 133 including a paddle wheel 135 and a sprocket gear 136 arranged in axially spaced relation thereon; whereas, hub 134 has a second paddle wheel 137 and a spur gear 138. Sprockets 131 and 136 are transversely aligned and interconnected by sprocket chain 139 which, of course, causes the screw 111 to rotate in the same direction as paddle wheel 135 when said paddle wheel is actuated in a manner to be described presently. On the other hand, spur gears 138 and 130 mesh with one another causing screw 111 to rotate in a direction opposite to that of hub 134 and paddle wheel 137 when said wheel is actuated.

Figure 9:
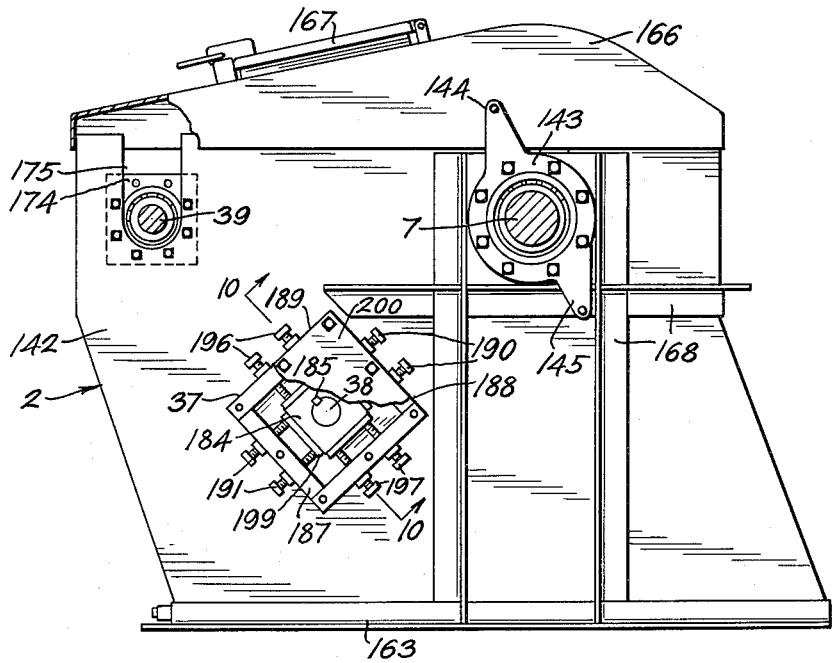
FIGURE 9 is a side elevation of the chain reducer, portions thereof having been shown in section and other portions broken away to expose the interior construction.

The actuating mechanism 40 which is used to run the trim-weight in and out on the hollow crank quill 36 can best be seen and described in connection with FIGURES 1, 16 and 17. The crank shaft 7 is journalled for rotation within roller bearings 140 attached to the side plates 141 of reducer box 142. A plate 143 having upper and lower ears 144 and 145, respectively, is bolted or otherwise attached to the outside of the housing containing roller bearing 140. Upper and lower pivot pins 146 and 147 project outwardly from the upper and lower ears, respectively, as shown most clearly in FIGURE 9. Upper and lower pivot arms 148 and 149 are mounted on pins 146 and 147, respectively, for rockable movement, adjacent ends of said arms being interconnected by connecting link 150. Upon arm 148 is provided at its free end with an upper kicker 151; whereas, lower arm 149 includes a lower kicker 152 located between pin 147 and link 150.

Referring specifically now to FIGURES 16 and 17, it will be seen that the aforementioned arms and link serve only one function, namely, to effect simultaneous movement of kickers 151 and 152 through the lower, intermediate or neutral, and upper positions, most of which have been indicated by dotted lines. The lower or full line position of kicker 152 places it in the circular path, indicated by the smaller dotted line circle, which is described by paddle wheel 137 as it rotates counterclockwise (arrow FIGURE 16) on the right-hand crank as seen from the Samson post 4 looking toward the horsehead 11. At the same time, kicker 151 occupies the upper or full line position in which it is inoperative to strike either paddle wheel. Therefore, as the right-hand crank moves through the bottom of its arcuate path, kicker 152 will strike paddle wheel 137 causing it, hub 134 and spur gear 138 to rotate clockwise as they would be seen in FIGURE 22. This, of course, causes gear 130 and screw 111 to turn counterclockwise or in a direction to move the trim-weight 110 radially outward away from crank shaft 7. In this connection it is important to note that gravity and centrifugal force both cooperate to move the trim-weight away from the crank shaft as the crank quill 36 is moving through the lowest point on the crank circle, as indicated in FIGURES 16 and 17. Also, although sprockets 131 and 136, hub 133, and paddle wheel 135 are driven when screw 111 rotates as aforementioned, they rotate independent of the spur gears and paddle wheel 137, and are thus substantially inoperative.

When the kickers 151 and 152 are positioned in the intermediate or neutral position indicated by adding the identifying letter "a" thereto, both become inoperative to strike either paddle wheel 135 or 137. This, of course, is the position occupied by the kickers under all operating conditions except when the trim-weight 110 is being adjusted.

The third position of the kickers is that designated by adding the letter "b" to the identifying numerals 151 and 152. Kicker 152 is in its uppermost position 152b in which it is completely inoperative; whereas, kicker 151 is in its uppermost position 152b in which it is completely inoperative; whereas, kicker 151 is in its lowermost position 151b wherein it is located to strike paddle wheel 135 as it follows the circular path on the rotating crank indicated by the larger of the dotted line circles. Note, however, that paddle wheel 135 is struck as the quill moves through the upper part of the crank circle. Thus, kicker 151 in the "b" position strikes paddle wheel 135 and rotates it, hub 133, sprocket gear 136, sprocket gear 131 and screw 111 clockwise as seen in FIGURE 22 causing the trim-weight 110 to move in toward the crank shaft 7. Here again, gravity assists the sprocket drive in moving the trim-weight as the crank quill is at the uppermost point in the crank circle at the time the screw is turned by kicker 151.

In the interests of brevity, the crank counterbalance system and actuating means therefor used on the lefthand crank have not been illustrated or described herein. It will be apparent, however, that the same principles can be applied with suitable modifications to adapt them to lefthand operation.

Referring now to FIGURE 1 wherein one form of linkage has been illustrated that could be used to position the kickers in the manner aforementioned, it will be seen that arm 149 is pivotally connected to link 153, through a bell crank 154 and a link 155 to a pivoted operating lever 156 mounted on the Samson post. In the position shown, the operating lever and associated linkage are positioned to move the trim-weight away from the crank shaft. As shown, lever 156 includes a pawl 157 positionable in one of three notches 158 corresponding to the positions of the kickers.

In FIGURE 23 it will be seen that the kicker 151 is mounted on the end of arm 148 in a manner to provide a yieldable connection therebetween. The end of arm 148, in the specific form shown, is bifurcated and provided with a pivot pin 159 upon which the kicker 151 is pivotally mounted. A looped spring 160 encircling the pin 159 and having arms 161 and 162 connected to the arm 148 and kicker 151, respectively, functions to hold said kicker in extended position until such time as the trim-weight 110 reaches the end of its travel along screw 111; whereupon, the paddle wheel 135 must stop and kicker 151 yield by closing the legs of spring 160. Kicker 152 is yieldably mounted in a similar manner within a slot in arm 149 as indicated by dotted lines in FIGURE 16.

At this point it would be well to emphasize a few of the more salient features of the crank counterbalance system just described. First of all, by dividing the crank counterbalance into coarse-weights which are substantially permanent and a trim-weight that constitutes a relatively small portion of the total counterbalance, it becomes possible to employ semi-automatic counterbalancing techniques which would be a practical impossibility if an attempt were made to shift the entire counterbalance system. Secondly, the coarse-weight section is located at the extreme end of the crank where the maximum counterbalancing effect per pound of weight is realized. Third, and of prime practical importance, is the fact the unit can be balanced by one person in a very short time while the unit is in operation. A simple shift of the operating lever is all that is required to adjust the trim-weight in either direction and it, therefore, becomes possible to maintain the unit in precise balance at all times and under all operating conditions. Fourth, the mechanical energy of rotation of the cranks is utilized to effect adjustment of the trim-weight thus permitting semi-automatic counterbalance of crank weights without any auxiliary source of power. Finally, should the counterbalance system fail for some reason, the trim-weight will always stop and remain fixed in relation to the quill and crank shaft as it cannot move unless the screw turns.

Figure 12:
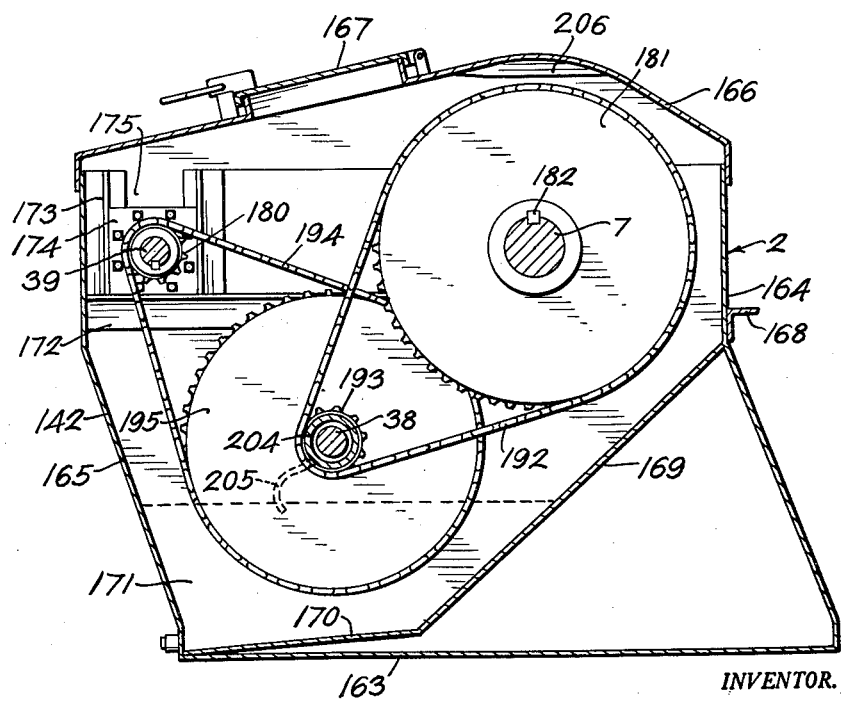
FIGURE 12 is a section taken along line 12—12 of of FIGURE 11 showing the chain drive.

The attention is now directed to FIGURES 9–12 of the drawing where the chain reducer 2 has been illustrated in detail. The chain reducer is enclosed within a box 142 which has side walls 141, a bottom 163, a front wall 164, a rear wall 165 and a lid or cover 166 that includes a trap door 167. In the preferred embodiment of the present invention, the sides, front and base of the box are reinforced with angle iron braces 168 located at the points of greatest stress. The inside of the box is provided with a steeply inclined wall 169 and a sloping wall 170 connected thereto to form an oil reservoir 171 in the bottom, as shown in FIGURE 12. Both side walls 141 also include a horizontal angle iron support 172 on the inside thereof near the top and spaced vertical supports 173 which extend upwardly therefrom to define a pocket for the support of high speed shaft bearings 174 which are bolted to the side walls adjacent upwardly opening notches 175 formed on the top edge to the rear of the box. The belt-driven high speed shaft 39 is journalled for rotation within roller bearings 174 mounted inside the side walls as aforementioned. Both ends of shaft 39 project beyond the bearings and side walls with the multiple-groove pulley 176 of belt-drive 14 attached to one projecting end for conjoint rotation; whereas, the other projecting end is provided with a brake drum 177 encircled by a brake bank 178 operatively connected to an operating lever 179. A small sprocket gear 180 is keyed to belt-driven high speed shaft 39 for conjoint rotation therewith.

The low speed crank shaft 7 is journalled for rotation within roller bearings 140 bolted on the outside of side walls 141 within a pocket formed between intersecting reinforcing members 168. Crank shaft 7 is located in the front end of the box near the top in spaced parallel relation to shaft 39. A large double sprocket gear 181 is connected to crank shaft 7 for conjoint rotation therewith by key 182. The side walls 141 of the box 142 also include upwardly opening notches 183 to receive the crank shaft 7. The ends of the crank shaft 7, of course, project beyond the bearings 140 in position to receive cranks 5.

The intermediate stationary shaft 38 is mounted non-rotatably between the side walls of the box within the means 37 by which said shaft is adjusted relative to both the crank shaft 7 and belt-driven shaft 39. Shaft 38 is located in spaced parallel relation to shafts 7 and 39 although it is positioned between and below them as shown. In the preferred embodiment illustrated herein, the axis of shaft 38 lies at the apex of approximately a right angle including the axes of shafts 7 and 39. Means 37 includes a rectangular block 184 non-rotatably secured to the opposite ends of shaft 38 by key 185. The side walls 141 include enlarged openings 186 therein which receive shaft 38 and permit movement thereof relative to shafts 7 and 39.

A rectangular frame 187 is bolted or otherwise attached to the side walls 141 of box 142 in position to surround the rectangular block 184 in spaced relation thereto. The edge 188 of frame 187 facing crank shaft 7 lies normal to a line drawn between the axes of said shaft and shaft 38; whereas, edge 189 thereof is normal to a line extending from the axis of shaft 38 to the axis of shaft 39. One pair of set screws 190 is threaded through edge 188 of the frame while a second pair 191 is threaded through the opposite edge of the frame, both sets seating against rectangular block 184. By adjusting these two pairs of set screws 190 and 191, the tension in sprocket chains 192 interconnecting double-sprocket gear 181 and a small double sprocket gear 193 journalled for rotation on shaft 38, can be adjusted without materially affecting the tension in sprocket chain 194 interconnecting sprocket gear 180 and large sprocket gear 195 journalled for rotation on shaft 38. In a similar manner, a pair of set screws 196 is threaded through edge 189 of frame 187 while another pair 197 is threaded through the opposite parallel edge. Both of the latter pairs of set screws seat against block 184 and function to adjust the tension in chain 194 without materially affecting the tension in chain 192. In the particular embodiment shown herein, all the set screws turn in depressions 198 formed in slide blocks 199 which rest against the edges of block 184. The frame 187 is covered by a cover plate 200 as shown.

Shaft 38 is formed to provide spaced annular shoulders 201 against which the inner races of ball bearings 202 abut. The outer races of these bearings are held in place between the removable end plates 203 bolted to the opposite ends of sprocket gear hub 204 which is journalled for rotation on said ball bearings. Double sprocket gear 193, in the form shown, is formed integral with hub 204; whereas, sprocket gear 195 is bolted thereto.

Figure 10:
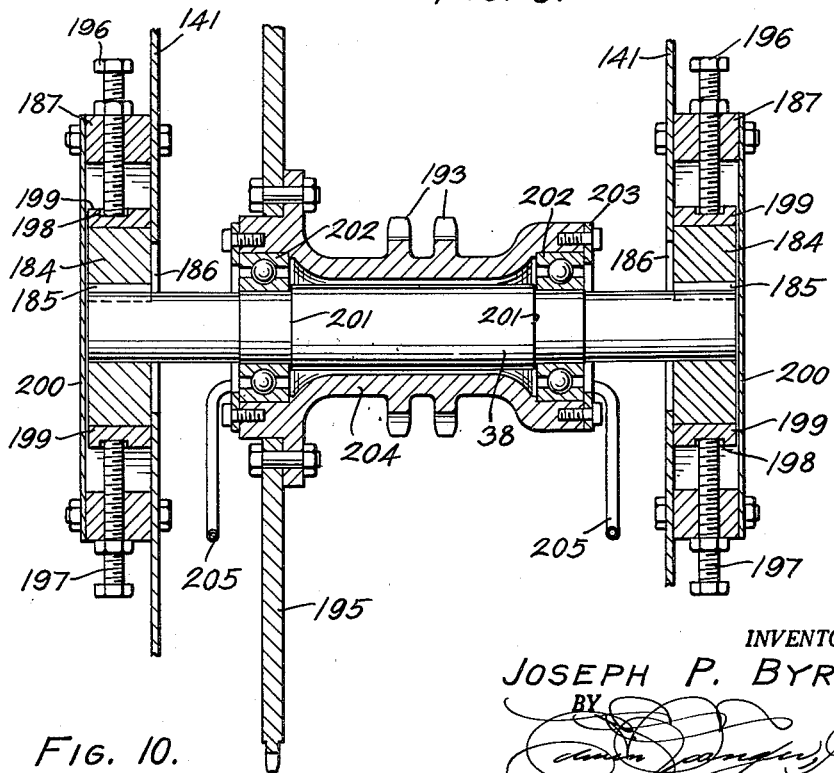
FIGURE 10 is an enlarged fragmentary section taken along line 10—10 of FIGURE 9 showing the crank shaft, sprockets and adjustable shaft mountings.
Figure 11:
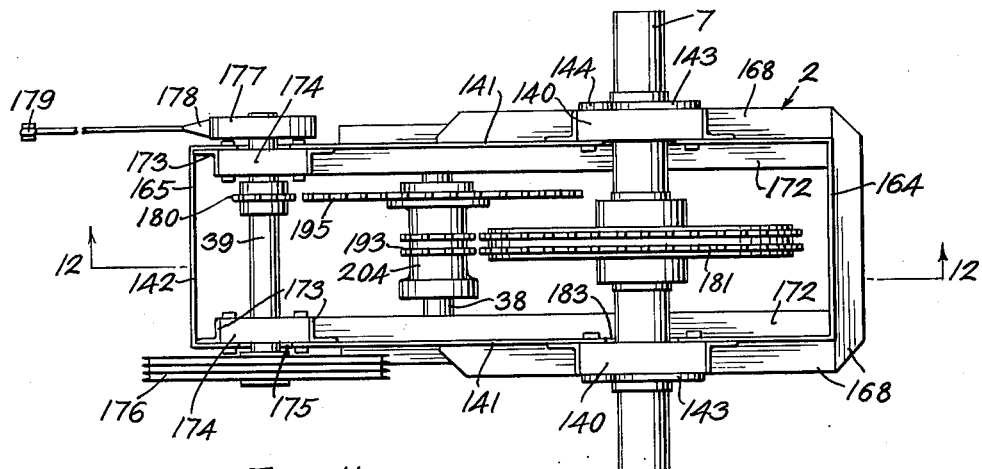
FIGURE 11 is a top plan view of the chain reducer with the cover removed.

In operation, oil reservoir 171 is filled with oil to a level slightly below shaft 38. S-shaped pipes 205 are mounted on opposite ends of hub 204 with the inner ends thereof opening into bearings 202 which are substantially enclosed inside the hub and end plates 203. As the hub 204 is rotated, these S-shaped dip into the oil which then runs down the pipes and into the bearings as shown in FIGURES 10 and 12. The remaining elements inside the chain box are generally kept well lubricated by oil thrown around by sprocket 195 which is immersed in the reservoir; however, if desired, a finned collector plate 206 (FIGURE 12) can be attached to the cover 166 of the box in position to drip oil splashed thereon onto sprocket 181 and chain 192. Chain 194, of course, dips into the reservoir and carries oil to sprocket 180 which, therefore, does not require supplementary lubrication.

Figure 24:
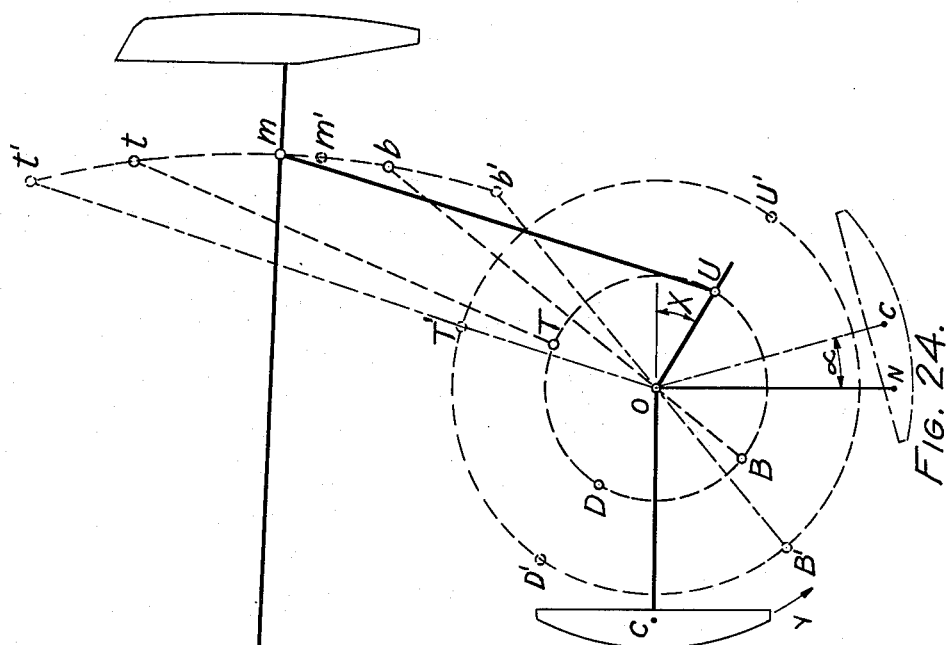
FIGURE 24 is a diagrammatic representation showing the beam, a crank and a pitman in various operative relationships which have a pronounced effect upon the relation between the upper and lower pitman bearing axes of rotation; and, FIGURE 25 is a geographical representation illustrating the fundamental torque relationships as they would exist in an ideal pumping unit.

The most unique feature of the pumping unit of the present invention is the novel geometry employed therein and which will now be discussed in detail. Reference will be had to FIGURE 24 of the drawing wherein the operative relationships between the various components have been shown in diagrammatic form for an explanation of the improved motion at the polished rod that is achieved by the instant design. First of all, the assumption is made that the crank shaft 7 is rotating at a constant speed which means, of course, that the pivot axis of the lower pitman bearing moves around the crank circle at a uniform angular velocity. Note that in both FIGURES 1 and 24, the crank shaft axis of rotation is displaced rearwardly from the line passing through the points "$t$" and "$b$" on the circular arc described by the upper pitman bearing axis of rotation which represent the points of reversal over top and bottom, respectively; hence, the points "T" and "B" on the crank circle at which the horsehead and walking beam reverse direction over top and bottom, respectively, are not angularly spaced 180° apart as would be the case if the axis of rotation of the crank shaft did lie on the straight line defined by points "$t$" and "$b$." Points "$t$" and "$b$" will, of course, vary with the effective length of the crank arm; yet, the foregoing relationship remains valid. Therefore, assuming counterclockwise rotation of the cranks as viewed in FIGURES 1 and 24, the horsehead goes from the top of its stroke to the bottom in the time interval required for the lower pivot axis of the pitman to traverse arc "TDB"; whereas, the horsehead moves from bottom to top during the time interval required for the lower pitman axis to move through arc "BUT" of the crank circle. Then, assuming uniform angular velocity for the lower pitman bearing pivot axis, it will be obvious that the lifting stroke of the unit takes place at a slower average rate than the return stroke.

The fact that the lifting stroke proceeds more slowly than the return stroke becomes significant in the following respects. During the lifting or work stroke, the prime mover must supply sufficient torque at the reducer crank shaft to lift the well load less the torque produced by the crank counterbalance which acts in opposition to the well load and, therefore, assists the prime mover. During the return or downstroke, on the other hand, the opposite relation exists and the prime mover must deliver the differential torque between the counterbalance torque less the torque produced by the well load. Note, however, that the torque produced by the well load during the lifting stroke and the return stroke are different as the upstroke well load includes the fluid load along with the weight of the road string; whereas, the downstroke well load is minus the fluid load component. Accordingly, the work requirements of the prime mover at the reducer crank shaft are greater during the lifting stroke than the return stroke if the unit is properly counterbalanced. Therefore, by lengthening the time interval during which the work of lifting the well load is accomplished, the instantaneous torque requirements on the prime mover are decreased along with the maximum instantaneous torque load thereon. Conversely, when the time interval during which the return stroke takes place is decreased, the instantaneous torque requirements on the prime mover are thus increased along with the minimum instantaneous torque load which, in overall effect, produces a more balanced and uniform torque load on the prime mover during the full crank cycle. There are, however, several other factors which are a function of the unit geometry that also contribute to more even torque loads on the prime mover and which have been incorporated into the instant pumping device. These other factors will be discussed presently.

Referring again to the diagram of FIGURE 24, it will be seen that as the pivot axis of the lower pitman bearing moves through the upper 180° arc of the crank circle "UTD" at a constant speed, the horsehead will swing through circular arc "mt," reverse over top, and return to point "m" having traversed the distance "2mt" during the time interval required to complete one-half the crank cycle. Similarly, when the pivot axis of the lower 180° arc of the crank circle "DBU" at a constant speed, the horsehead will swing through circular arc "mb," reverse over bottom, and return to "m" having traversed a distance "2mb" during the same time interval required for the lower pitman pivot axis to move through the upper half of the crank circle. The arcuate distance "2mt" is obviously considerably greater than arc "2mb"; yet, both of these arcuate distances are traversed by the horsehead during an equal time interval. Therefore, it should be apparent that the horsehead will reverse more slowly over the bottom of its stroke than over the top thus introducing substantially less whip in the rod string than the conventional beam-type mechanical pumper wherein the horsehead reverses fast across bottom and slowly over top. This improved motion at the polished rods is brought about by the forward mounting of the reducer on the well-side of the Samson post instead of at the rear of the post as is the case with the conventional beam-type mechanical pumper.

The diagram of FIGURE 24 also shows the effect of decreasing the pitman-crank ratio on the aforementioned improved motion at the polished rods or horsehead. When the axis of the lower pitman bearing is moved outwardly from the crank shaft axis to provide a longer crank arm in relation to the fixed length of the pitman, a representative crank circle of increased diameter would thus be defined by circular arc "B'U'T'D'" as shown. Note, however, that as the diameter of the crank circle described by the pivot axis of the lower pitman bearing increases, the circular arc "B'U'T'" increases insofar as the included angle is concerned when compared with arc "BUT" of the smaller crank circle although points "B'" and "T'" still represent the points at which the horsehead reverses over bottom and top, respectively. Similarly, the minor arc "T'D'B'" becomes smaller than arc "TDB". Thus, by decreasing the pitman-crank ratio, a substantial increase in the time provided for the work stroke is achieved while reducing the time interval for the return stroke. As before, this results in a more uniform torque load on the prime mover at the reducer crank shaft by lowering the maximum instantaneous torque requirements while increasing the minimum instantaneous torque load.

In this same connection it will be seen that the circular arc "m't'" has increased in length when compared with arc "mt"; but, it has increased less than arc "m'b'". Therefore, a decrease in the pitman-crank ratio results in an increase in both the rate of reversal over the top and bottom of the stroke assuming the crank speed remains unchanged; however, the rate of reversal over bottom does not increase as much as the rate of reversal over top. This means that if the angular velocity of the crank were reduced proportionately to the increase in the radius of the crank circle, the decrease in the pitman-crank ratio resulting from the increase in the radius of the crank circle would cause a reduction in the speed of reversal over bottom and an increase in the rate of reversal over top. Thus, it can be concluded that decreasing the pitman-crank ratio causes a corresponding increase in the rate of reversal over top when compared with the rate of reversal over bottom.

In a twin-crank pumping unit such as that shown herein there are, however, certain practical limitations on the amount by which the pitman-crank ratio can be decreased. Approximately a 2.5:1 pitman to crank ratio is the practical limit for a double-crank pumper that will allow the walking beam to clear the reducer and the cranks to clear the well-head and ground. This is not to say, however, that units driven by a single crank and pitman could not be designed in accordance with the foregoing teaching which would employ a pitman-crank ratio of 1:2. It will become apparent, therefore, that the pitman-crank ratio illustrated herein of approximately 6:1 is by no means optimum insofar as beneficial motion at the polished rods is concerned although it does approach a practical optimum when the aforementioned structural limitations are considered. Irrespective of how close the pitman-crank ratio of the present unit approaches the optimum, the important fact is that the worst possible pitman-crank ratio of a front-driven unit like that shown herein is better than the best pitman-crank ratio that can be employed on a standard beam-type rear-driven mechanical pumper. It can be proven mathematically that the instant pumping unit with an ∞:1 pitman-crank ratio would reverse over bottom and top of the stroke at the same rate; whereas, any finite ratio will cause the horsehead to reverse more slowly over bottom than top. Conversely, the rear-driven pumper with the reducer beneath the rear end of the walking beam and behind the Samson post reverses over top and bottom at the same speed with an ∞:1 pitman-crank ratio; but, any finite pitman-crank ratio causes the horsehead to reverse faster over bottom than top resulting in considerable "whip" being introduced into the rod string.

One important improvement brought about by the novel unit geometry of the present pumper insofar as establishing more uniform torque requirements for the prime mover is concerned has already been discussed, namely, the displacement of the crank shaft axis of rotation to the rear of the line passing through points "t" and "b," the arc described by the upper pitman bearing axis in order to lengthen the time interval during which the work stroke takes place while shortening by a like interval the time alloted for the return stroke; however, the instant unit also incorporates certain additional features which further enhance the desirable more uniform torque relationship. In order to properly describe these additional features it will be necessary to examine some of the fundamental torque relationships that exist in the conventional pumping units and show how they have been, in a sense, altered by rearrangement and redesign of the unit components to provide a considerably more uniform and more economical torque load on the prime mover.

The conventional crank-counterbalanced beam-type mechanical pumper has a number of major torsional forces operating at the reducer crank shaft. As aforementioned, the prime mover must apply a torsional force to the reducer crank shaft equal to the differential torque created by the rotating counterweights on the one hand, and the reciprocating well loads on the other. Thus, the upstroke prime mover torque equals the torque produced by the well load less the torque produced by the counterweights; whereas, the downstroke prime mover torque equals the torque produced by the counterweights less the torque produced by the well load.

A representation of the net resultant torque requirements at the crank shaft may be obtained graphically by plotting the purely sinusoidal counterbalance torque curve against the well load torque curve for a crank-counterbalanced beam-type mechanical pumper wherein the reducer is located behind the Samson post and, thereafter, combining the ordinates of the two curves to obtain the net resultant torque picture. When this is done, it will be found that the torque requirements go to zero at least twice during each complete cycle of the cranks because the well load torque at the crank shaft is reversing over top at the same time the counterbalance torque at the shaft is reversing over bottom, and vice versa. A unit of this type that is either over or under counterbalanced, may produce a resultant torque picture that goes to zero as many as four times each cycle. Accordingly, this rapid and frequent torque fluctuation between zero and maximum of the conventional mechanical pumper makes it difficult for the reducer to develop even a reasonably uniform torque requirement.

Bearing in mind the foregoing undesirable torque characteristics of the conventional unit and also knowing the end result desired, namely, a more uniform torque loading of the prime mover, it is possible to construct a set of curves emulating an ideal torque relationship on a hypothetical basis. Such a graphic representation is set forth in FIGURE 25. The purely sinusoidal dotted line curve represents, of course, the crank counterbalance torque relationship of a crank-counterbalanced unit. This curve is phased to gravity so that when the crank weights are vertically upward or vertically downward, they produce no torque; whereas, on the other hand, when these weights are horizontal on either side of the crank they produce maximum torque. The counterbalance curve crosses the horizontal reference axis at 0°, 180° and 360°. The addition or subtraction of counterweights on the crank varies only the amplitude of this curve and it remains a pure sinusoid.

Figure 25:
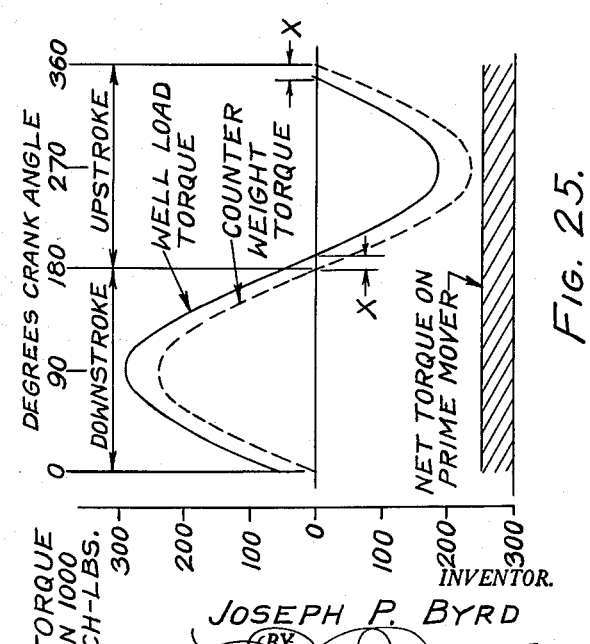

Now, it is also known that the ideal net resultant torque curve of a hypothetical pumping unit would be a straight line having a constant ordinate distance above the horizontal reference axis as shown in FIGURE 25. From the net torque and counterbalance torque curves, the ideal hypothetical well load torque curve can be constructed and has been shown in FIGURE 25 as the full line curve.

It would be well at this point to examine and compare the counterbalance and well load curves noting some of their characteristics. First of all, the hypothetical well load torque curve does not cross the horizontal reference axis at 0°, 180° and 360°; but, is out of phase with the counterbalance curve and, therefore, intersects the reference axis at points quite different from the 0°, 180° and 360° intersections of the counterbalance curve. Secondly, the maximum amplitudes of the well load torque curve fall directly above the maximum amplitudes of the counterbalance torque curve thus providing uniform ordinate separation therebetween. Third, the peaks of the downstroke and upstroke lobes of the well load curve are of unequal amplitude, the downstroke being the smaller of the two. Furthermore, the upstroke or major lobe of the well load curve is larger than the downstroke or minor lobe thereof, the major lobe having a length in excess of 180° along the horizontal reference axis. Finally, the major lobe of the well load curve fits externally on the upstroke or first half-cycle lobe of the counterbalance curve; whereas, the minor lobe of the well load curve fits internally within the second half-cycle lobe of the counterbalance curve.

Therefore, the aforementioned requirements all must be fulfilled in an actual well load torque curve if it is to fit the counterbalance curve with the continuous uniform ordinate separation that signifies the achievement of the relatively constant torque load on the prime mover throughout the crank cycle. It has now been found in accordance with the teachings of the present invention that the purely hypothetical well load torque curve can, in fact, be approximated by a unique redesign and rearrangement of the pumping unit components.

The first problem was to phase the well load and counterbalance torque curves so that each reached its maximum amplitude at approximately the same time twice during each cycle when it was known that similar curves for a conventional beam-type crank-counterweighted pumper showed these peaks occurred at different times in both the upstroke and downstroke lobes of the crank cycle. It was found that the desired phase shift between the well load and counterbalance torque curves could be accomplished through the use of offset cranks in which the lower pitman bearing pivot axis bore an obtuse angular relation less than 180° to the crank counterweights when the crank shaft axis was considered as the apex of the obtuse angle. In other words, the cranks were formed to provide a dog-leg on opposite sides of the crank shaft. In FIGURES 1 and 24, the angle by which the arm 34 of the crank is offset from a straight-line relation has been designated "X." The angle "X" should lie between 0° and 45°; whereas, field tests of the unit have indicated that this angle preferably lies between approximately 20° and 30°.

The actual selection of the offset angle "X" which was incorporated into the unit evolved from a complex series of calculations and vector analyses based upon a wide range of rod and fluid loads. Two basic assumptions were made, namely, that the prime mover was rotating at a constant angular velocity and that the harmonic loads generated in the rod string were disregarded. A complete set of theoretical dynamometer cards were constructed covering a typical range of rod and fluid loads. Then a curve of instantaneous velocities at the polished rod was constructed covering a complete crank cycle at 15° intervals. This curve involved a rigorous vectorial analysis to which were drawn a series of tangents representing instantaneous polished rod accelerations. From the hypothetical dynamometer cards which covered the complete range of typical pumping conditions, it was possible to multiply the instantaneous well loads by the corresponding instantaneous acceleration to provide a series of instantaneous forces at the polished rod.

Next, the instantaneous well loads were plotted as a function of crank rotation to determine the torque at the crank shaft due to these well loads, taking into consideration the beam and pitman angularity. Then the crank counterbalance was rotated through a complete cycle and its effective torque plotted on a second set of curves. The crank counterbalance was varied as was the well load to provide the most harmonious counterbalance for a given set of assumed conditions.

Thereafter, these two sets of curves were superimposed and shifted relative to one another in order to arrive at the most advantageous phase relationship therebetween. Once this optimum phase relationship between the well load and counterbalance torque curves was determined which placed the half-cycle peaks at the same point in the crank cycle, it became a simple matter to note the angular difference between the intersection of these curves with the horizontal reference axis and use this angular spread as the offset angle of the cranks "X" in FIGURE 25.

The resultant phase angle shift between the torque curves of the well load and counterbalance load produced a resultant prime mover torque load which was fairly uniform, of a minimum magnitude and non-reversible. It was also noted that the phase angle was substantially independent of the well load throughout the entire speed range of the unit. Pumping units were actually constructed and field tested based upon the foregoing hypothetical phase angle relationship and found to agree quite closely with the empirical expectations. A phase angle "X" of about 25° seems to provide excellent results.

The second problem was to widen out the upstroke lobe of the well load torque curve so that it would fit externally on the corresponding lobe of the counterbalance torque curve and, at the same time, diminish the width of the down-stroke lobe of the well load curve to fit inside the other counterbalance curve lobe. This was accomplished by displacing the crank shaft axis of rotation to the rear of the straight line passing through the points of reversal over top and bottom of the upper pitman bearing axis and by decreasing the pitman-crank ratio as has already been described in detail. The net result was, of course, to lengthen the time interval during which the upstroke took place thus widening the major lobe of the well load torque curve. Conversely, the time interval for the downstroke was reduced thereby diminishing the width of the minor lobe of the well load curve.

Therefore, by the use of the offset or dog-leg crank which produces the phase shift between the well load and counterbalance torque curves, the displacement of the crank shaft axis to the rear of the line through the reversal points of the upper pitman bearing axis, and by decreasing the pitman-crank ratio to vary the width of the lobes of the well load curve, it becomes a reality to have these curves intersect the reference axis at the desired points. The overall result of this reorientation of the well load torque curve relative to the counterbalance torque curve was to eliminate the condition where both the well load and counterbalance torque relationships along with, of course, the resultant prime mover torque relationships along with, of course, the resultant prime mover torque went to zero at the same time; hence, the prime mover was under a fairly uniform, non-reversible work load during the entire crank cycle.

The remaining problem was to adjust the amplitude of the major and minor lobes of the well load torque curve to provide approximately uniform ordinate separation when compared with the corresponding lobes of the counterbalance torque curve. Three factors were found to influence and, therefore, determine the relative amplitudes of the lobes of the well load torque curve. First of all, the forward placement of the reducer on the well-side of the Samson post results in the major lobe of the well load torque curve being arranged externally on the corresponding lobe of the counterbalance torque curve and the minor lobe of said well load curve being positioned internally with respect to the other lobe of the counterbalance curve. The amplitudes of the well load lobes, however, are functions of the pitman-crank ratio and the displacement of the reducer crank shaft axis to the rear of the line through the reversal points of the upper pitman bearing axis, these being the second and third factors important to this relationship.

From an examination of FIGURE 24, it will be apparent that the maximum effective lifting moment will be realized when the crank circle "B'U'T'D'" described by the lower pitman bearing axis is approximately tangent to a vertical line tangent to the arcuate path described by the upper pitman bearing pivot axis. While it is known that such an arrangement would provide the optimum effective lifting moment, there were certain other important considerations which became controlling and led to the selection of a resultant lifting moment somewhat less than the maximum that it was possible to achieve as indicated by crank circle "BUTD" in FIGURE 24. In FIGURE 1 it will be seen that the main consideration was one of practicality as the reducer had to be displaced rearwardly toward the Samson post a sufficient distance to allow the crank counterweights to clear the well-head. Obviously, the cross yoke could have been placed farther to the rear of the horsehead so that the crank weights could clear the well head even with the unit arranged to provide the maximum lifting moment; however, this was also impractical as it would have required a much stronger, and therefore larger, walking beam.

Another consideration of equal, and perhaps greater, importance was the location of the reducer between the well-head and Samson post in a position which would provide the most uniform ordinate separation between the well load and counterbalance torque curves during both the upstroke and downstroke segments of the crank cycle. Therefore, the effective lever arm available on the downstroke to resist the pull of the polished rods also had to be considered in locating the reducer. As a basic premise it can be said that to achieve a nearly uniform torque load on the prime mover as it rotates at a constant angular velocity, the force relationship at the pitman must resolve itself into a primarily vertical force component during the lifting stroke when the prime mover must raise both rods and fluid; whereas, on the return stroke, the forces at the pitman should resolve themselves in both a horizontal and vertical force component in which the resultant thereof is that force required to resist the weight of the rods alone when the prime mover is loaded to substantially the same extent it is on the upstroke.

With reference again to FIGURE 24 of the drawing, it will be seen that this desirable end has been achieved in the instant unit. As the cranks move through the workstroke "BUT," the pitmans approach vertical position and, therefore, nearly all of the output of the prime mover is effectively used in lifting the rod and fluid load. During the return stroke, on the other hand, the inclination of the pitmans is such that they tend to lay back along the beam where the component of the force pattern that resists the pull of the rod string is substantially smaller than on the upstroke and requires nearly the same torque output from the prime mover, a substantial portion of which is resolved into a horizontal force component acting in a direction to pull the Samson post over onto the reducer. Thus, by locating the reducer between the Samson post and well-head, the maximum torque loads on the prime mover during the work and return strokes became more nearly equal thereby providing the desired uniform ordinate separation between the counterbalance and well load torque curves during both the up and downstrokes. Ideally, when the pivotal connection between the pitman and crank occupies the position T' on the crank circle (the instant at which the beam reverses direction over the top of its stroke), the center of mass "C" of the crank counterbalance will be displaced in the direction of its movement "Y" from its lowest point of travel or nadir "N" by an angle "$\alpha$" which angle is approximately one-half of that angle T'Ob' by which the circular arc described by the pivotal connection between the pitman and crank exceeds 180° during the lifting stroke; i.e. arc B'U'T'.

Under actual field tests of the unit claimed herein compared with a conventional crank-balanced rear-driven beam-type mechanical pumper where both units had an equal stroke length, speed and capacity, the instant pumping device was found to have a 50% smaller maximum power amplitude than the conventional unit on the same well and under the same well-load. The total range of power required of the prime mover was 55% less in the present unit than the rear-driven pumper. The unit described herein was found to run continuously forward at all times irrespective of well load or speed; whereas, the conventional unit stopped and reversed at least twice each cycle under standard pole meter tests. Also, it appeared that a prime mover only two-thirds the size required on the conventional unit was capable of performing the same amount of work on the claimed pumper.

Thus, the novel unit geometry of the instant pumper along with the dog-leg crank concept provides a much more uniform torque load on the prime mover and effects a considerable reduction in the peak torque requirements of the pumper. This, of course, results in smaller prime movers, lower power and fuel costs, reduced maintenance costs, the elimination of back-drive and the attendant reduction in reducer and prime mover maintenance, increased efficiency, and increased component life.

Having thus described the several useful and novel features of the improved mechanical oil field pumper of the present invention in connection with the accompanying drawings and diagrams, it will be seen that the several useful objects for which it was designed have been achieved. Although but one specific form of the instant invention has been illustrated and described herein, I realize that these novel concepts are applicable to many different mechanical movements and that certain changes and modifications therein may well occur to those skilled in the art within the broad teachings hereof; hence, it is my intention that the scope of protection afforded hereby shall be limited only insofar as said limitations are expressly set forth in the appended claims which follow or which may be added hereafter.

What is claimed is:

1. In a pumping device for oil wells and the like, post support means, beam means mounted on the post support means for rockable movement in a substantially vertical plane, means depending from a free end of the beam means adapted to be connected to a rod string or the like, a prime mover, a speed reducer having a crankshaft operatively connected to the prime mover for rotational movement, at least one crank attached to the crankshaft for rotational movement therewith about its axis of rotation, a pitman operatively connected between each crank and the beam means adapted to effect rockable movement of the latter, and counterbalance means carried by each crank for movement therewith around the crankshaft axis, the counterbalance means being divided into a coarseweight section and a trimweight section, the trimweight section being mounted on the crank for radial adjustment relative to the crankshaft axis.

2. In a pumping unit for oil wells and the like, post support means, beam means mounted on the post support means for rockable movement in a substantially vertical plane, means depending from a free end of the beam adapted to be connected to a rod string or the like, a prime mover, a speed reducer having a crankshaft operatively connected to the prime mover for rotational movement, at least one crank attached to the crankshaft for rotational movement therewith about its axis of rotation, a pitman operatively connected between each crank and the beam means adapted to effect rockable movement of the latter, counterbalance means carried by each crank with its center of mass located in spaced relation to the crankshaft axis, said counterbalance means including a coarseweight section mounted on a free end of the crank and a trimweight section mounted on the crank for radial adjustment relative to the crankshaft axis, adjustment means carried by each crank and operatively connected to the trimweight section adapted upon actuation to shift the center of mass of the counterbalance means toward and away from the crankshaft axis, and actuating means mounted for movement into operative engagement with the adjustment means while the cranks are rotating, said actuating means being adapted in a first operative position to cooperate with the adjustment means to move the trimweight section toward the crankshaft axis and in a second operative position to move said trimweight section away from said crankshaft axis.

3. The pumping device as set forth in claim 2 in which the adjustment means comprises a screw carried by the crank for rotational movement in a fixed position and upon which the trimweight section of the counterbalance means is mounted for adjustable movement between the ends thereof as said screw means rotates.

4. The pumping device as set forth in claim 2 in which, the adjustment means comprises screw means carried by the crank for rotational movement in a fixed position, and the actuating means includes an actuator mounted for selective movement between two engaged positions, said actuator being adapted in one of said engaged positions to turn the screw means in one direction and in the other of said engaged positions to reverse the direction of rotation of said screw means.

5. In a pumping unit for oil wells and the like, post support means, beam means having one end pivotally connected to the upper end of the post means for rockable movement in a substantially vertical plane, means depending from the free end of the beam means adapted to be connected to a rod string or the like, and drive means located in front of the post means underneath the beam means operatively connected to said beam means to effect rockable movement thereof, said drive means including at least one pitman having the upper end thereof pivotally connected to the beam means, a speed reducer having a crankshaft journalled for rotation therein, a crank mounted on the crankshaft for rotation about a point intermediate the ends thereof with one free end pivotally connected to the lower end of each pitman, counterbalance means carried on the other free end of each crank, and a prime mover operatively connected to the crankshaft adapted to turn the crank counter clockwise when viewed with the well on the right, the crankshaft axis being located relative to a straight line passing through the points of reversal over top and bottom on the circular arc described by the pivotal connection between the pitman means and said beam means such that the points on the crank circle described by the pivotal connection between said pitman and crank representing said points of reversal over top and bottom are angularly spaced apart by an angle greater than 180° during the lifting stroke of the device.

6. The pumping device as set forth in claim 5 in which, with the pivotal connection between the pitman and crank located at that point on the circular arc described thereby that represents its position at the instant of reversal of the beam means at the top of its stroke, the center of mass of the counterbalance means occupies a position in relation to its nadir that is displaced in the direction of movement therethrough by an angle equal to approximately one-half that angle by which the circular arc described by the pivotal connection between the pitman and crank that represents the lifting stroke exceeds 180°.

7. In a pumping device for oil wells and the like, post support means, beam means having one end pivotally connected to the upper end of the post support means for rockable movement in a substantially vertical plane, means depending from the free end of the beam means adapted to be connected to a rod string or the like, drive means located on the well-side of the post support means operatively connected to said beam means to effect rockable movement thereof, said drive means including at least one pitman having the upper end thereof pivotally connected to the beam means, a speed reducer having a crankshaft journalled for rotation therein, a crank mounted on the crankshaft for rotation about a point intermediate the ends thereof with one free end pivotally connected to the lower end of the pitman, and a prime mover operatively connected to the crankshaft for effecting rotational movement thereof, and counterbalance means carried on the other end of the crank, the crankshaft axis being located relative to a straight line passing through the points of reversal over top and bottom on the circular arc described by the pivotal connection between the pitman and beam means such that the points on the circular arc described by the pivotal connection between said pitman and crank representing said points of reversal over top and bottom are angularly spaced apart by an angle greater than 180° during the lifting stroke of the device, and the center of mass of the counterbalance means, with the pivotal connection between the pitman and crank located at that point on the circular arc described thereby that represents its position at the instant of reversal of the beam means at the top of its stroke, being located in relation to its nadir such that it is displaced angularly from said nadir in the direction of its movement therethrough by an angle equal to approximately one-half that angle by which the circular arc described by said pivotal connection between the pitman and crank that represents the lifting stroke exceeds 180°.

8. In a pumping device for oil wells and the like, post support means, beam means having one end pivotally connected to the upper end of the post support means for rockable movement in a substantially vertical plane, means depending from the free end of the beam means adapted to be connected to a rod string or the like, drive means located on the well-side of the post support means underneath the beam means operatively connected to said beam means to effect rockable movement thereof, said drive means including at least one pitman having the upper end thereof pivotally connected to the beam means, a speed reducer having a crankshaft journalled for rotation therein, a crank mounted on the crankshaft for rotation about a point intermediate the ends thereof with one free end pivotally connected to the lower end of the pitman, and a prime mover operatively connected to the crankshaft for effecting rotational movement thereof, and counterbalance means carried on the other end of the crank, the crankshaft axis being located relative to a straight line passing through the points on the circular arc described by the pivotal connection between the pitman and said beam means that identify the instants said beam means reverses its direction of movement over both top and bottom of its stroke such that the points on the circular arc described by the pivotal connection between the pitman and crank that represent said points of reversal over top and bottom are spaced apart angularly by an angle greater than 180° during the lifting stroke of the device.

9. In a pumping device for oil wells and the like, post support means, beam means mounted on the post support means for rockable movement in a substantially vertical plane, means depending from a free end of the beam means adapted to be connected to a rod string or the like, drive means located beneath the beam means and operatively connected thereto for effecting rockable movement thereof, said drive means including a prime mover, a speed reducer having a crankshaft operatively connected to the prime mover for rotational movement therewith, and a pitman pivotally interconnecting the crank and beam means, and counterbalance means carried by the crank with its center of mass located in spaced relation to the axis of rotation of the crankshaft, the crankshaft axis being located relative to a straight line passing through the points on the circular arc described by the pivotal connection between the pitman and beam means that represent the instants at which said beam means reverses its direction of movement over both the bottom and top of its stroke such that the corresponding points on the circular arc described by the pivotal connection between the pitman and crank that represent the positions of said last-mentioned pivotal connection at the instants the reversal of said beam means take place over both top and bottom are spaced apart angularly from one another by an angle greater than 180° during the lifting stroke of the device, and the center of mass of the counterbalance means occupying a position relative to the pivotal connection between the pitman and crank that is displaced from said last-mentioned pivotal connection in a direction such that the resultant moment produced by the counterbalance means about the crankshaft axis opposes the direction of rotation of the crank during movement of said counterbalance means through an angle equal to approximately one-half the acute angle by which the circular arc described by said pivotal connection between the pitman and crank exceeds 180° at both the beginning and end of the lifting stroke.

10. The pumping device as set forth in claim 9 in which the crankshaft axis is positioned on the opposite side of the straight line passing through the points on the circular arc described by the pivotal connection between the pitman and beam means from the side on which the well head is located.

References Cited in the file of this patent

UNITED STATES PATENTS

| | | |
|---|---|---|
| 1,501,226 | Malbaff | July 15, 1924 |
| 1,917,701 | Crites et al. | July 11, 1933 |
| 1,979,803 | Livingston | Nov. 6, 1934 |
| 2,042,294 | Bloss | May 26, 1936 |
| 2,134,326 | De Lamater | Oct. 25, 1938 |
| 2,152,702 | Mansfield | Apr. 4, 1939 |
| 2,190,070 | Holzer | Feb. 13, 1940 |
| 2,200,292 | Patterson | May 14, 1940 |
| 2,213,362 | Cardwell | Sept. 3, 1940 |
| 2,219,080 | Slonneger | Oct. 22, 1940 |
| 2,221,593 | Lessman | Nov. 12, 1940 |
| 2,334,741 | Anderson | Nov. 23, 1943 |
| 2,515,360 | Vail | July 18, 1950 |
| 2,618,172 | Shoup | Nov. 18, 1952 |